J. T. KILBY.
PITMAN.
APPLICATION FILED JAN. 20, 1910.
970,929.
Patented Sept. 20, 1910.
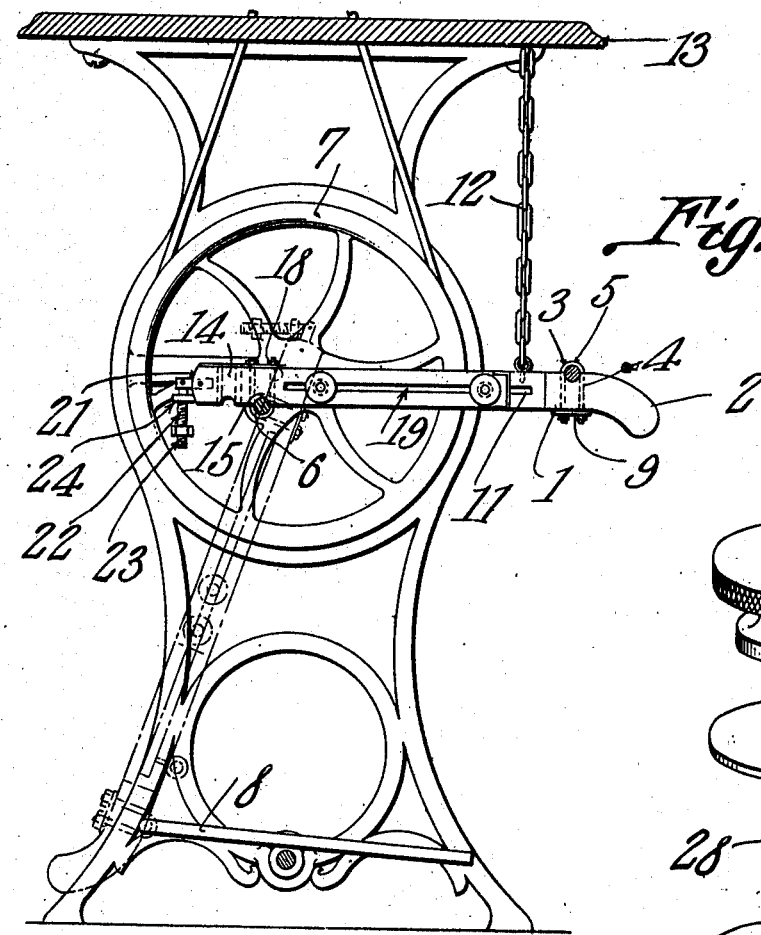
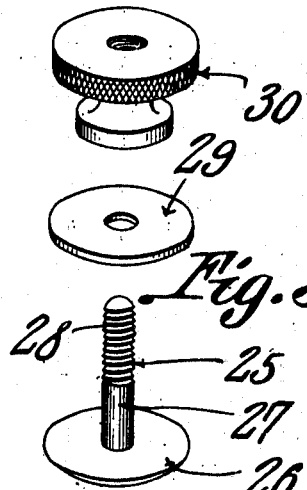
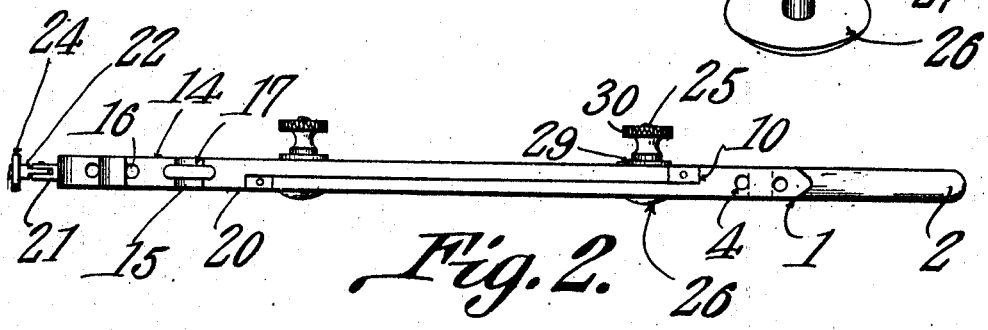
Witnesses
Inventor
James T. Kilby.
By C. A. Snow & Co.
Attorneys

UNITED STATES PATENT OFFICE.

JAMES T. KILBY, OF DANVILLE, VIRGINIA.

PITMAN.

970,929. Specification of Letters Patent. Patented Sept. 20, 1910.

Application filed January 20, 1910. Serial No. 539,094.

*To all whom it may concern:*

Be it known that I, JAMES T. KILBY, a citizen of the United States, residing at Danville, in the county of Pittsylvania and State of Virginia, have invented a new and useful Pitman, of which the following is a specification.

This invention has relation to pitmen particularly designed to be used upon sewing machines and it consists in the novel construction and arrangement of parts as hereinafter shown and described.

The object of the invention is to provide a simple structure in the form of a pitman which may be conveniently used by hand for rotating the driving wheel of the machine or which may be connected with the crank of the driving wheel and the foot treadle as desired.

In order that the pitman may be readily adjusted to machines of different sizes and makes it is longitudinally extensible and securing devices are provided for holding the adjustable parts of the pitman in desired position.

In the accompanying drawing Figure 1 is a sectional view through the base and table of a sewing machine showing the pitman in elevation, said pitman being in full lines in position to be actuated by hand and in dotted lines connected with the treadle. Fig. 2 is an edge elevation of the pitman. Fig. 3 is a perspective view of a clamping bolt, nut and washer used upon the pitman.

The pitman consists of a member 1 having at one end a downturned handle 2 and provided in its upper edge and in the vicinity of the said handle 2 with a half bearing 3. Perforations 4 extend through the member 1 at opposite sides of the half bearing 3 and are adapted to receive the legs of a staple 5. The intermediate portion of the said staple together with the half bearing 3 forms a complete bearing which may be applied to the wrist pin 6 of the drive wheel 7 of the sewing machine or to a similar pin (not shown) mounted upon the treadle 8. Nuts 9 are screw threaded upon the ends of the legs of the staple 5 and serve as means for adjusting the intermediate portion of the said staple with relation to the half bearing 3.

The inner portion of the member 1 is cut away at one side as at 10 and the said member is provided with an elongated slot 11. One end of a chain 12 is connected with the upper edge of the member 1 and may be attached to the table 13 of the sewing machine. A member 14 is provided in the vicinity of one end and upon its lower edge with half bearings 15 of different sizes, said bearings 15 having perforations 16 located at their opposite sides and the said perforations being adapted to receive the legs of a staple 17. Nuts 18 are screw threaded upon the ends of the staple 17 and the said staple 17 coöperates with the half bearing 15 in a similar manner as has been described with relation to the staple 5 and the half bearing 3. The inner portion of the member 14 is provided with an elongated slot 19 and the inner portion of the said member 14 is cut away at one side as at 20 and the cut away portion of the members 1 and 14 are adapted to bear against each other and when together the sum total of their transverse breadth is equal to the transverse breadth of the end portions of the members 1 and 14 respectively. A pin 21 is fixed to the end of the member 14 and projects beyond the ends thereof and a screw 22 is pivotally attached at one end to the said pin. A clamp nut 23 is screw threaded upon the said screw and the screw is provided at a point in the vicinity of its pivot end with a shoulder 24. The said screw may be projected through openings provided in the treadle 8 and by tightening the nut 23 against the lower side of the treadle the said treadle may be clamped between the said nut and the shoulder 24. Thus should the treadle be devoid of a pivot end the openings in the ornamentation thereof may be utilized as a means for connecting the pitman with the same. Also by such provision the pitman may be connected with the front or rear portion of the treadle as desired.

Clamp bolts 25 are provided with relatively large and flat heads 26 and the portions 27 and are adapted to fit snugly in the slots 11 and 19 of the members 1 and 14. The end portions of the said bolts 25 are threaded as at 28 and washers 29 are adapted to fit over the threaded portions of the said bolts and clamp nuts 30 are adapted to engage the threaded portion 28 of the said bolts. The slots 11 and 19 are not in longitudinal alinement with the half bearings 3 and 15 and consequently when the said half bearings are applied to wrist pins or pivots as indicated and the pitman is moved longitudinally the strain is transmitted through the pitman from one half bearing at one end thereof to a half bearing at the other end thereof, and such a strain is not in alinement with or parallel to the slots 11 and 19, and consequently the members 1 and 14 may be held in adjusted position with a slight clamping pressure upon the slotted portions of the members between the heads of the bolts 25 and the clamp nuts 30. Consequently the members may be readily adjusted without the use of tools and when adjusted will maintain relation. By this arrangement it will be seen that a simple pitman structure is effected which is perceptible of various adjustments to meet the different conditions and conveniences and which when so adjusted the parts thereof are positively held in desired relation.

Having described the invention what I claim as new and desire to secure by Letters-Patent is:

A pitman comprising members having elongated slots, securing devices passing through the slots of the members, one member having at its upper edge in the vicinity of its end a bearing, said member having a downturned handle projecting beyond the edge of the inner portion opposite the edge having said bearing, the other member having at its lower edge in the vicinity of its outer end a bearing, said bearings being out of longitudinal alinement with the slots.

In testimony that I claim the foregoing as my own I have hereto affixed my signature in the presence of two witnesses.

JAMES T. KILBY.

Witnesses:
 WM. C. LONHOFF,
 G. E. SCROGHAM.